Feb. 27, 1934.    A. R. OLPIN    1,948,941
ELECTROOPTICAL SYSTEM
Filed May 24, 1930
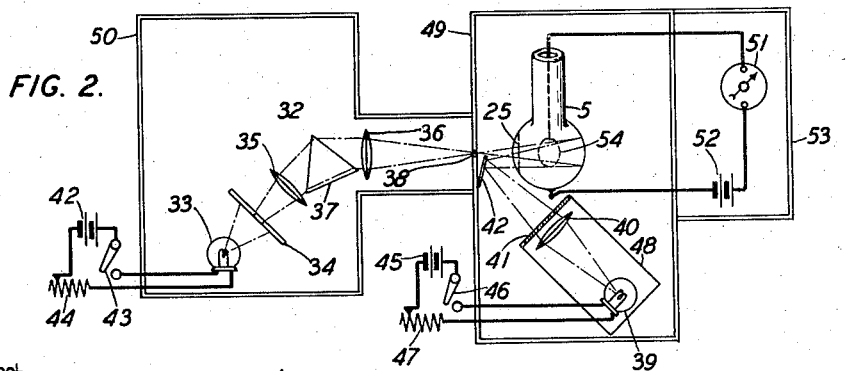
FIG. 2.
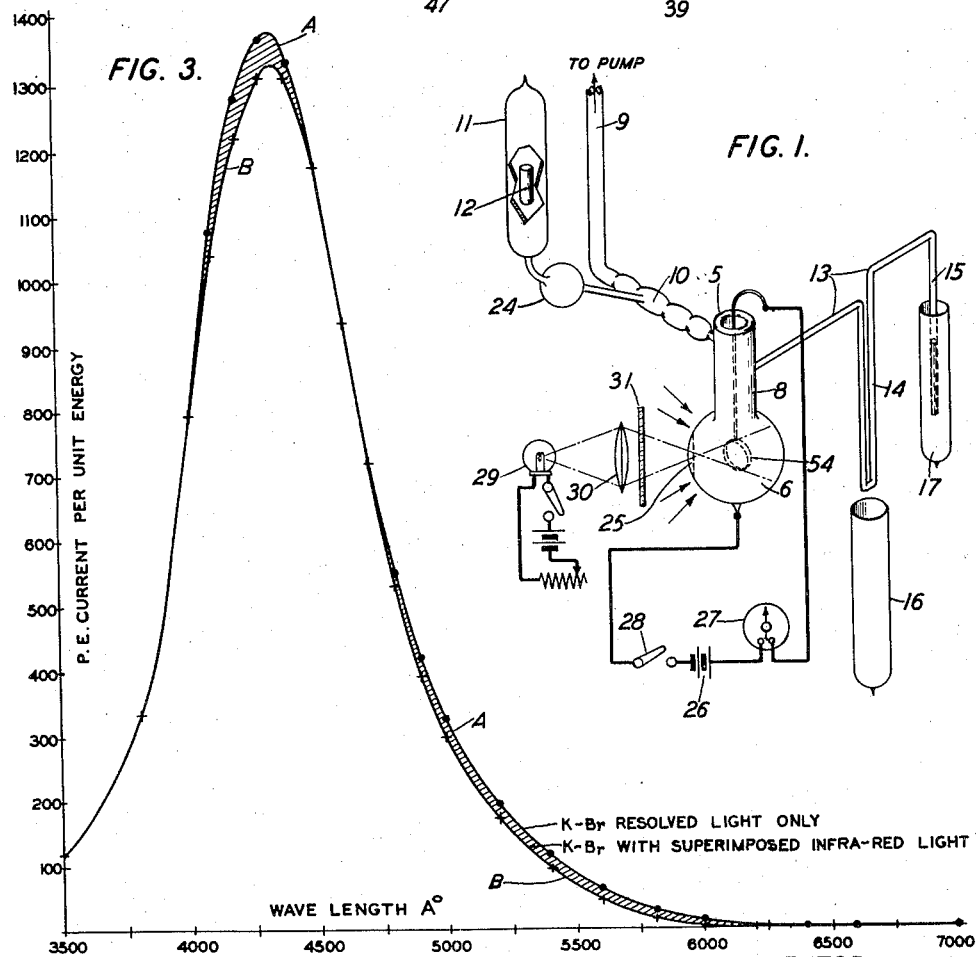
FIG. 3.
FIG. 1.
INVENTOR
A. R. OLPIN
BY Stanley B. Kent
ATTORNEY Patented Feb. 27, 1934

1,948,941

UNITED STATES PATENT OFFICE 1,948,941

ELECTROOPTICAL SYSTEM

Albert R. Olpin, Flushing, N. Y., assignor to Bell Telephone Laboratories, Incorporated, New York, N. Y., a corporation of New York Application May 24, 1930. Serial No. 455,212

2 Claims. (Cl. 250—41.5)

This invention relates to electro-optical systems and more particularly to means for controlling the current in a light reactive device.

An object of the invention is to provide a new and improved means for controlling an electric current by light or radiant energy.

In an example of practice illustrative of the invention, a photoelectric cell having a cathode comprising potassium which has been subjected to small amounts of bromine or iodine vapor during manufacture, is subjected to visible light of constant intensity to cause electron emission from the cathode and then irradiated with infra-red light to decrease the emission. There is no measurable electron emission when the cells are irradiated with infra-red light alone obtained by passing white light of color temperature 2848° K through a No. 87–EK Wratten filter. These cells, however, show a general increase in the response to visible light of all wave lengths and a marked increase to light at both ends of the visible spectrum over the response of the well-known potassium hydride cells.

As a result of this invention there is provided means for rendering a light reactive device which is normally unresponsive to radiation of a certain wave length, responsive to radiation of such wave length. This is accomplished by means external to the device and without permanently changing the structure of the device. So far as applicant is aware he is the first to accomplish this result.

The invention will now be described more in detail having reference to the accompanying drawing:

Fig. 1 is a diagrammatic showing of a portion of the apparatus used in making a photoelectric cell in accordance with this invention;

Fig. 2 illustrates another form of the invention;

Fig. 3 is a graph of data obtained with the apparatus of Fig. 2.

The manufacture of photoelectric cells according to this invention will first be described with reference to Fig. 1. The cell proper comprises a glass vessel 5 having a substantially spherical-shaped portion 6 which is about 2 inches in diameter. The cathode of the cell is formed on the inner surface of the portion 6. An anode 54 in the form of a nickel ring is supported from the stem 8. The cell 5 is connected to a vacuum pump station by a glass tube 9. Between the tube 9 and the cell 5 is a distilling tube 10 to which is connected a side tube 11 within which photoelectric material within a glass capsule 12 is placed prior to being distilled into the cell 5. A tubulation 13 comprising a U-shaped portion 14 and a sealed-end tube 15 is also connected to the stem 8 through which activating material is introduced. Dewar flasks 16 and 17 are provided for cooling the U tube 14 and the end tube 15, respectively.

The vacuum pump station connected to tube 9 is of well-known type capable of producing a high vacuum. It is provided with an arrangement for introducing inert gas as required and is also equipped with a McLeod pressure gauge, a liquid air trap and an ionization gauge.

The cathode of one cell to be described, by way of example, comprises an opaque layer of potassium, the surface of which is treated with small amounts of iodine vapor. A capsule 12 of previously purified potassium is inserted in the chamber 11 which is then sealed. A small amount of iodine in crystalline form is placed in the tube 15 which is cooled with liquid air and sealed to the tubulation 13, the U-tube 14 also being cooled with liquid air. The system is then thoroughly evacuated and the cell 5 outgassed by heating. The chamber 11 and the capsule 12 are then heated until the potassium within the capsule 12 is sufficiently molten to break through the end crust of oxide and flow into the bulb 24. From the bulb 24 the potassium is successively distilled through the bulbs of the distilling tube 10 to form an opaque layer of potassium on the inside of the spherical portion 6. By means of a point flame a window 25 about one inch in diameter is made at one side of the bulb 6 through which exciting light is introduced. After the potassium coating has been formed the side tube 15 is allowed to warm up or is slightly heated to cause iodine vapor in small amounts to enter the chamber 6. During the time that the iodine vapor is being admitted a test circuit comprising battery 26 and galvanometer 27 is completed by the closing of switch 28 in order that any change in response to light may be noted readily. The battery is so connected as to make the anode 54 positive with respect to the cathode. The pump is left running during the treatment of the surface. Light from a constant source is directed normally through the window onto the back of the cell. The amount of vapor introduced is determined by the sensitivity conditions desired. In the present cell vapor was introduced three separate times, any excess being removed by the pumping operation between the periods of introduction.

The cell is normally treated in a lighted room which may be daylight or artificial light from ordinary tungsten electric lights. Such illumination in Fig. 1 is represented by the arrows pointed toward the cell 5. The cell is also illuminated from a tungsten filament lamp 29, light from which is directed to the interior of the cell 5 by lens 30. In order to determine the response of the cell to red light, a red filter 31 is placed between the lens 30 and the cell 5. Provision is also made for reducing or practically eliminating the ordinary illumination of the room from daylight or artificial room light.

This cell which for convenience will be called the potassium-iodine (K—I) cell is unresponsive to red light passing through the filter 31 which transmits only light of wave length longer than 6000 A°. It shows less response, however, to superimposed room light and red light than to room light alone. In other words, the cell response to visible light is inhibited by the superimposition of red light and light of still longer wave length. The same effect is present when filter 31 is a No. 87—EK Wratten filter which is visually opaque. The transmission through this filter is 0.1% at a wave length of 7400 A°, 1.0% at 7500 A° and in the neighborhood of 90.0% at 7600 A° and above 90.0% for longer wave lengths.

Another typical cell showing the same effect has a cathode comprising an opaque layer of potassium the surface of which is treated with bromine vapor. This cell will be designated as the potassium-bromine (K—Br) cell. It is made in substantially the same way as the potassium-iodine cell except that liquid bromine is sealed in the tube 15 from which the bromine vapor is produced by allowing the tube to heat up. In order to further increase the sensitivity of the cathode is was found desirable to apply a point flame to the glass bulb 6 near the edge of the window 25 during the course of the activation.

Still another typical cell was produced by the use of sodium and bromine vapor. This cell will be designated as the sodium-bromine (Na—Br) cell. In its manufacture the same process was followed as making the potassium bromine cell except that an opaque layer of sodium was formed on the interior of the bulb 6 instead of an opaque layer of potassium.

Another embodiment of the invention is illustrated in Fig. 2. In this embodiment a photoelectric cell 5 is arranged to be illuminated from two sources of light operable either separately or simultaneously as desired.

One of the sources is a monochromatic illuminator 32 which is symbolically represented by a tungsten filament lamp 33, an opaque screen with slit 34, lenses 35 and 36, prism 37 and slit 38. By means of this device substantially monochromatic light of any desired wave length may be passed through the slit 38 to illuminate the cathode of cell 5.

The other source comprises a tungsten filament lamp 39, light from which is directed by lens 40 through filter 41 to a mirror 42 from which it is reflected to substantially the same portion of the cathode of cell 5, which is illuminated by the monochromatic light from the illuminator 32. The current for the filament of lamp 33 is supplied from battery 42 through switch 43, the strength of this current and hence the intensity of the light from the filament is controlled by a variable resistance 44. Similarly, the filament of lamp 39 is supplied with current from battery 45 through switch 46, the intensity of illumination being controlled by variable resistance 47. The lamp 39 and lens 40 are included in a light-tight casing 48. The cell 5 and the casing 48 are enclosed in a light-tight casing 49 which is of metal and acts as an elecetrical shield. The measuring instrument 51 and the battery 52 are enclosed in an electrically shielded casing 53. The measuring instrument and the battery are included in an electrical circuit comprising the anode-cathode path within the cell 5. The measuring instrument 51 may be an electrometer, a galvanometer or other suitable circuit for utilizing current controlled by the cell 5.

As an example of how the invention may be used for signaling purposes the measuring instrument 51 of Fig. 2 or other translating device may be removed from the casing 53 to a distant station and the conductors connected thereto extended to constitute a transmission line. Signaling may be effected by interruptions or varying the illumination from either one or both of sources 33 and 39 in accordance with signals. One way of doing this is by the operation of switches 43 and 46 or the variation of resistances 44 and 47. The monochromatic illuminator 32 may be replaced by a source of illumination having components extending over a range of wave lengths.

Using the apparatus of Fig. 2 the data recorded in Fig. 3 was obtained. Curve A, the data points of which are indicated by the dots, shows the response of the potassium-bromine cell when subjected only to monochromatic light of the wave lengths shown as abscissæ. The wave lengths are shown in Angström units (A°). The ordinates represent the relative cell responses for equal amounts of light at the various wave lengths. The cell response units are arbitrary. In order to obtain the data for curve A, switch 46 is open to deenergize lamp 39 and switch 43 is closed to furnish the resolved light. Curve B shows the cell response when illuminated with monochromatic light of various wave lengths from the illuminator 32 upon which is superimposed light from the near infra-red source 48. The recorded data for curve B is indicated by the crosses. For curve B switch 46 as well as switch 43 is closed. These curves then show the effect on the current response of the potassium-bromine cell at different wave lengths of light from the monochromatic illuminator 32 due to illumination with near infra-red light. For these results the lamp 39 produced white light of color temperature 2848° K. This light was passed through filter 41 which was a No. 88–EK Wratten filter. The transmission of this filter is 1% at a wave length of 6900 A° and 5% at a wave length of 7000 A°. At shorter wave lengths than 6900 A° this filter is practically opaque. The intensity of the illumination of the cell from the source 48 is many times that from the illuminator 32.

The curves of Fig. 3 show that the reduction in response of the cell 5 due to superimposition of the near infra-red radiation is present in two spectral ranges. One from approximately 4000 A° to 4400 A° and the other from approximately 4700 A° to 6500 A°. The greatest reductions occur where the increase in response due to the bromine treatment is greatest.

For a given intensity of illumination of these cells with visible light, the amount of reduction due to the superimposition of near infra-red light is dependent upon the intensity of the superimposed light. Likewise the amount of the current decrease varies with the intensity of the visible light for a given value of intensity of the near infra-red light.

The term light reactive device as used in this specification signifies a device capable of changing the current flow therein in response to change of illumination thereof. The illumination may be due to electro-magnetic waves, either within or without the range of wave lengths to which the human eye is sensitive.

This invention is not limited to the particular arrangements and cells disclosed for illustrative purposes. The scope of the invention is defined by the appended claims.

What is claimed is:

1. In an electro-optical system, a photoelectric cell having an anode and a cathode, said cathode comprising potassium and bromine, means to illuminate said cell with visible light to cause an electron flow between said cathode and anode, and means to superimpose infra-red light on said visible light to reduce that portion of the electron flow due to visible light of wave length of 4200 Angström units.

2. In an electro-optical system, a photoelectric cell having an anode and a cathode, said cathode comprising potassium and bromine, means to illuminate said cell with visible light to cause an electron flow between said cathode and anode, and means to superimpose infra-red light on said visible light to reduce that portion of the electron flow due to visible light of wave lengths of approximately 4000 A° to 4400 A° and 4700 A° to 6500 A°.

ALBERT R. OLPIN.